(12) United States Patent
Abou Mahmoud et al.

(10) Patent No.: US 10,943,250 B2
(45) Date of Patent: Mar. 9, 2021

(54) TECHNOLOGY FOR USER ENGAGEMENT

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 15/185,042

(22) Filed: Jun. 17, 2016

(65) Prior Publication Data
US 2017/0364939 A1 Dec. 21, 2017

(51) Int. Cl.
*G06Q 30/02* (2012.01)
(52) U.S. Cl.
CPC ................ *G06Q 30/0231* (2013.01)
(58) Field of Classification Search
USPC .............. 705/14.1–14.78, 26.1–27.7, 37–70; 463/30–47
See application file for complete search history.

(56) References Cited

U.S. PATENT DOCUMENTS

| | | | |
|---|---|---|---|
| 7,523,111 B2 | 4/2009 | Walmsley | |
| 8,874,466 B2 | 10/2014 | Bethke et al. | |
| 8,972,275 B2 | 3/2015 | Park et al. | |
| 2009/0083631 A1 | 3/2009 | Sidi et al. | |
| 2011/0124297 A1 | 5/2011 | Son et al. | |
| 2011/0264494 A1* | 10/2011 | Lechowicz | G06Q 30/02 705/14.12 |
| 2012/0184349 A1* | 7/2012 | Barclay | G07F 17/3204 463/20 |
| 2014/0181215 A1 | 6/2014 | Omoko | |
| 2014/0256413 A1 | 9/2014 | Arezina et al. | |
| 2015/0081790 A1* | 3/2015 | Ogawa | G06Q 50/01 709/204 |
| 2015/0298004 A1* | 10/2015 | Villoria | A63F 13/52 463/42 |
| 2017/0111308 A1* | 4/2017 | Kim | H04L 51/34 |
| 2017/0169662 A1* | 6/2017 | Froy | G06F 3/005 |

OTHER PUBLICATIONS

Greg Caswell, Avalanche of Emails? Try the Email Game—Gamification Co, May 27, 2011 (Year: 2011).*
Xing Engages Message Systems to Boost Its Member Engagement Efforts; Publication Ttl: Wireless News; 2012; Publisher: Close-Up Media, Inc.; Country of Publication: USA; ISSN: N/A; Database: Gale Group Trade & Industry.

* cited by examiner

*Primary Examiner* — E Carvalho
(74) *Attorney, Agent, or Firm* — Anthony V. S. England; L. Jeffrey Kelly; Susan M. Maze

(57) ABSTRACT

A method for engaging a message recipient includes receiving, by a computer system for a recipient, a message having a collectible associated with at least one predetermined area of the message, wherein the at least one predetermined area has been selected by a sender. The method further includes detecting, by the computer system, that the recipient has viewed the at least one predetermined area of the message and awarding the collectible to the recipient by the computer system, so that the recipient can use the collectible in a transaction, wherein the awarding is responsive to the detecting of the viewing of the at least one predetermined area of the message.

13 Claims, 4 Drawing Sheets

TECHNOLOGY FOR USER ENGAGEMENT

FIELD OF THE INVENTION

The field of the present invention concerns controlling user engagement by a sender of media over a network.

BACKGROUND

In current times, people sometimes can get hundreds of digital communications on a daily-basis. Emails, social network posts and tweets are just a few examples.

SUMMARY

A method for engaging a message recipient includes receiving, by a computer system for a recipient, a message having a collectible associated with at least one predetermined area of the message, wherein the at least one predetermined area has been selected by a sender. The method further includes detecting, by the computer system, that the recipient has viewed the at least one predetermined area of the message and awarding the collectible to the recipient by the computer system, so that the recipient can use the collectible in a transaction, wherein the awarding is responsive to the detecting of the viewing of the at least one predetermined area of the message.

System and computer program products relating to the above-summarized method are also described and claimed herein.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
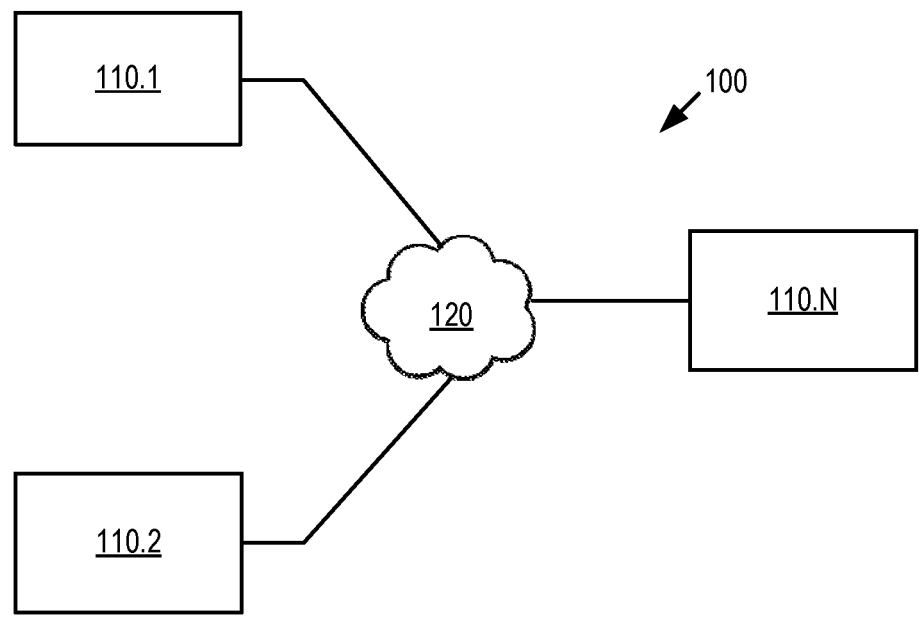
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N connects via network 120, which may be public or private. Systems 110.1, 110.2, etc. include modules, which may be program or hardware modules, configured to perform tasks for their own respective systems or for other systems or both.

Figure 2:
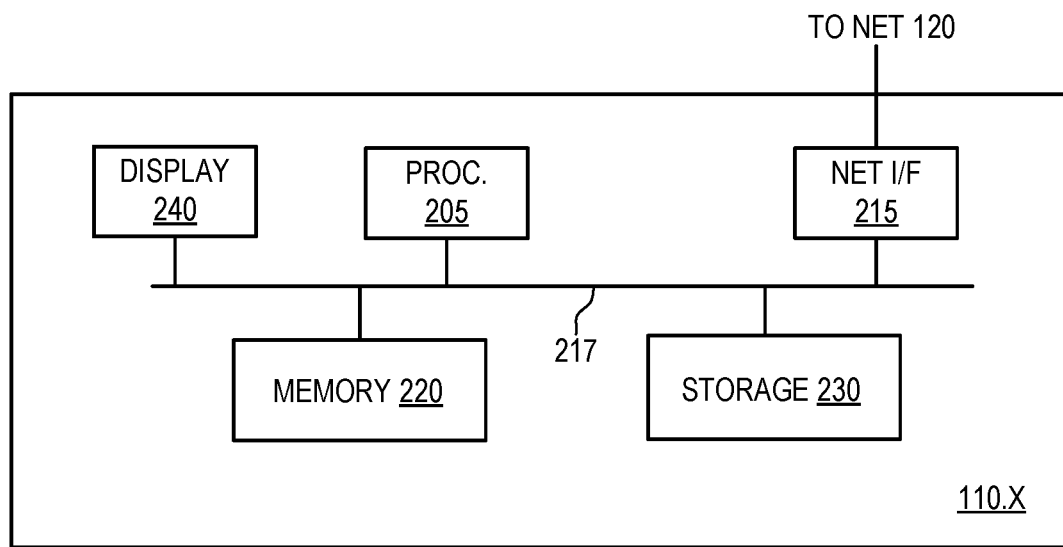
FIG. 2 is a block diagram of devices shown in FIG. 1, according to embodiments of the present invention.

FIG. 2 illustrates details of a computer system 110.X suitable as computer systems 110.1, 110.2, etc. according to embodiments of the present invention, wherein system 110.X includes at least one central processing unit (CPU) 205, network interface 215, interconnect (i.e., bus) 217, memory 220, storage device 230 and display 240 where system 110.X may include an icon management module 260. CPU 205 may retrieve and execute programming instructions stored in memory 220 for applications, including module 260. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random access memory, which includes data and program modules for run-time execution, such as model builder 103, according to embodiments of the present invention. It should be understood that system 110.X may be implemented by other hardware and that one or more modules thereof may be firmware.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

Due to the amount of information in digital communications, it's is difficult for a recipient to select received communications to read and focus on. Further, it is difficult for a sender of a digital communication to ensure that a recipient reads and focuses on a communication that the sender believes is important, let alone a particular portion of a communication. This issue may arise not merely due to the number of communications the recipient receives, but also due to the size of at least some of the communications.

For a long communication, such as a multi-page email, for example, the sender may especially want to ensure the recipient reads a particular part or parts of the communication for which the sender needs feedback or that the sender wants to promote. The particular part or parts of the communication may not necessarily be a part or parts that would ordinarily attract the recipient's attention and focus according to the recipient's history, profile and special interests.

Figure 3:
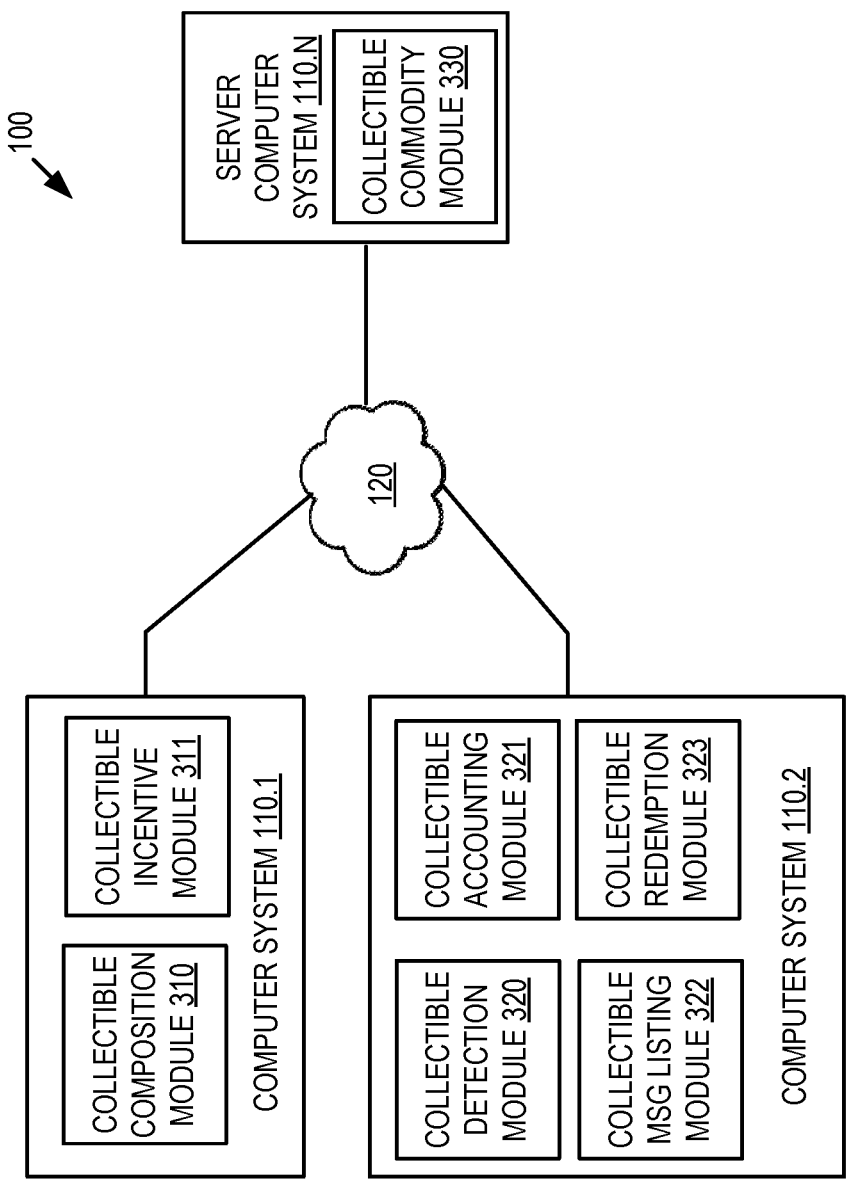
FIG. 3 illustrates additional aspects of computing environment 100 for controlling user engagement by a sender of media over a network, according to embodiments of the present invention.

Referring to FIG. 3, according to one or more embodiments of the present invention, for a user who is composing or editing a message via a digital communication application, e.g., email application, word processing application, social media application, etc., a collectible composition module 310 is provided for the user's computer system 110.1 that, when executed on the computer, causes a process to communicate with the digital communication application for receiving a user selection of an area in the message. Another term besides collectible that might be used is "gem," which is known in gaming. Games usually have gems a user must collect for points, equipment, lives, etc. Yet another term that might be applied is "scrip," which refers to any substitute for legal tender and is often a form of credit.

The process of the collectible composition module 310, according to embodiments of the present invention, may receive a user selection that is provided via the digital communication application, for example. In this context of composing a message and collectibles therein, a user is a sender. Accordingly, in this context, the term "user" and "sender" are interchangeable.

A first such way of user selection of an area of a message, for example, may include the user positioning a cursor of a mouse at the beginning of the selected area of the message shown on a display of the computer for the user, the user clicking a particular button of the mouse when the cursor of the mouse is thus positioned, the user holding down the shift key of the keyboard, then the user positioning the cursor at the end of the selected area of the message and clicking on the selected mouse button again. A second such way, for example, may include the user positioning a cursor of a mouse at the beginning of the selected area of the message, pressing and holding down a particular button of the mouse and dragging the cursor to the end of the selected area of the message. Other ways of selection are known and are included. For example, on some computer systems the display itself is touch sensitive and the user may select an area of a message using one or more fingers or a stylus.

Figure 4A:
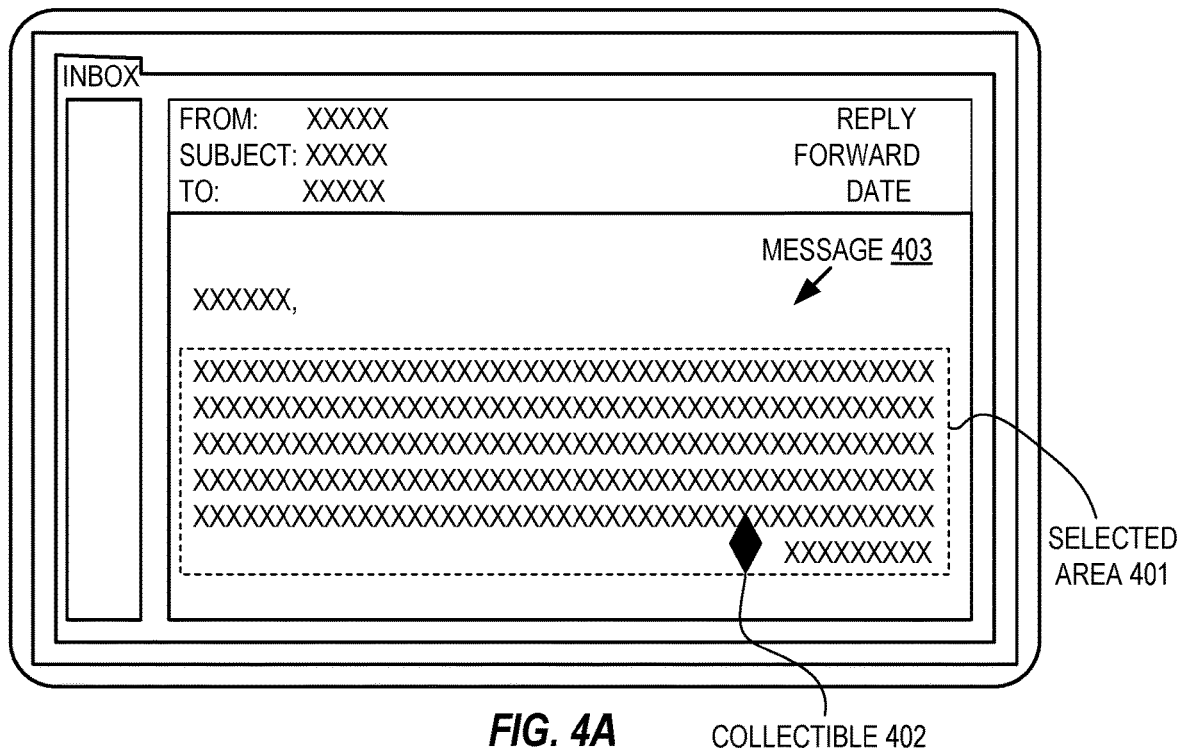
FIG. 4A illustrates a display of a computer for a user depicting a single selected area and a single collectible, according to embodiments of the present invention.

Referring now to FIG. 4A, a display of a computer for a user depicting a single selected area and a single collectible is illustrated, according to embodiments of the present invention. In general, the selected area 401 includes material in message 403 the sender wants the recipient to read or otherwise focus on, i.e., view, if the material is non-textual, such as an image, for example. Once the user has selected area 401, the collectible composition module 310 receives an input from the sender to associate a collectible 402 with the selected area 401 and to associate a value for collectible 402 specified by the sender. (Associating collectible 402 and its value with selected area 401 may also be referred to as "embedding"), A collectible incentive module 311 is also provided that is configured for a process thereof to receive inputs from the sender by which the sender specifies redemption amounts and objects, i.e., collectible value amounts that are required for a recipient to redeem in order for the recipient to obtain an object specified by the sender. Such values and objects are further described in the context of recipient actions herein below.

Further, according to one or more embodiments of the present invention, embedding a collectible 402 in message 403 may include adding recipient data structures to a message, i.e., program modules, such as a collectible detection module 320 and other program modules for a recipient such as described herein below, wherein the program modules operate with a digital communication application of a recipient.

Referring to FIGS. 3 and 4, according to one or more embodiments of the present invention, for a user who receives a message via a digital communication application, e.g., email application, word processing application, social media application, etc., collectible detection module 320 executing on the user's computer system 110.2 causes a process to communicate with the digital communication application for detecting receiving a collectible in a selected area in the message. When the recipient reads message 403 via the digital communication application, the program module embedded in message 403 detects collectible 402 in message 403 and communicates with the digital communication application to detect when the recipient reads a selected area 401 associated with collectible 402. In alternative embodiments, the collectible detection module 320 may be provided to the digital communication application independently of message 403. Or the collectible detection module 320 may be provided to a recipient's digital communication application of a particular type with a first message containing a collectible and of the particular message type to that recipient, whereas the program module is not provided to the recipient's digital communication application of that type thereafter. An email message and an email digital communication application are examples of a particular message type and a digital communication application of that type.

Figure 4B:
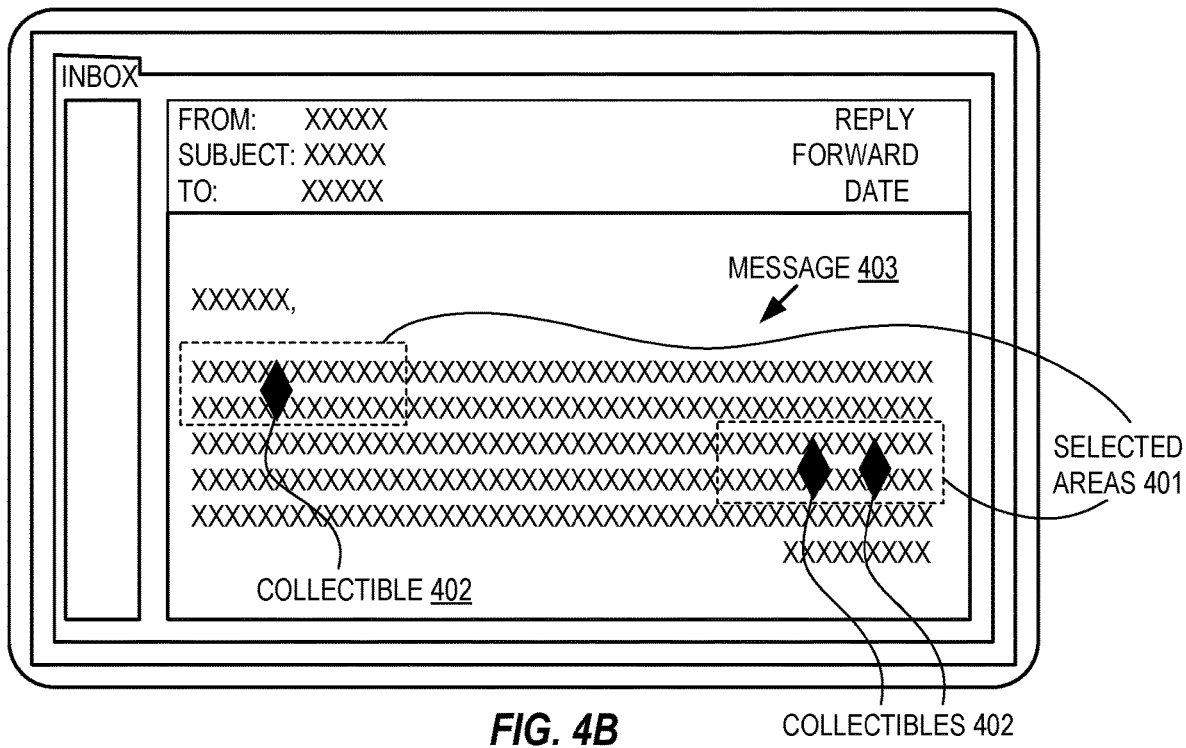
FIG. 4B illustrates a display of a computer for a user depicting multiple selected areas and multiple collectibles, according to embodiments of the present invention.

There may be more than one collectible in message 403. Referring now to FIG. 4B, a display of a computer for a user depicting multiple selected areas 401 and multiple collectibles 402 is illustrated, according to embodiments of the present invention. It should be understood that enabling the sender to select an area 401 of message 403 with which to associate a collectible 402 also enables the user to select a plurality of areas 401 of message 403 in which to embed respective collectibles 402. Further, a process of the composition module 310 may receive input from the user indicating to embed more than one collectible in a single selected area 401 of message 403.

A process of the composition module 310 may receive input from the sender indicating a plurality of selected areas 401 of message 403 with which to associate only a single collectible. Further, a process of the composition module 310 may receive input from the sender indicating a sequence of selected areas 401 of message 403. The sequence defines a mission for the recipient, i.e., a set of selected areas 401 for the recipient to read in the sequence defined by the sender. The sender may direct the process of the composition module 310 to associate only a single collectible with completion of the mission, such that the collectible can only be obtained by the recipient reading the selected areas 401 in the sequence defined by the sender.

There may also be a sequence of collectibles 402, and there may also be a bonus collectible. That is, a process of the composition module 310 may receive input from the sender directing the process of the composition module 310 to associate a collectible with each selected area in a defined sequence of selected areas 401, where each collectible can only be obtained by the recipient reading the selected areas 401 in the sequence defined by the sender, i.e., by the recipient completing the mission, and the sender may also direct the process of the composition module 310 to associate an additional, i.e., bonus, collectible or collectibles 402 with completion of the mission.

Once the user has embedded one or more collectibles 402 in message 403, the user may direct the collectible composition module 310 to insert an indication that a collectible is hidden in message 403. According to embodiments of the present invention, this may be by communicating to the collectible composition module 310 by a predefined keystroke, a pull down menu selection, or the like, which causes the module to insert (or to communicate to the digital communication application so that the digital communication application inserts) an indication representing a collectible such as in the form of text, which may include text with a different font type or color, for example; a water mark; an image, such as an image of a collectible; highlighting; or a non-visual location marker or overlay, for example. An overlay is a layer on top of the text as opposed to something inside of the text. For example, a transparent image on top of the text could be an overlay. The indication may also be in the form of a sound that is played when collectible 402 is encountered. The indication may encompass the entire selected area or part of the selected area. Thus, the sender may direct the collectible composition module 310 to insert a visual indication of a collectible with each selected area having an associated collectible.

The sender may direct the collectible composition module 310 to insert the indication in a location of message 403 that is apart from selected area 401, such as by a collectible icon next to title of a document or a subject line of message 403, according to different alternative embodiments of the present invention. Locating the indication apart from selected area 401 may encourage the reader to read the whole message.

The sender may also direct the collectible composition module 310 to insert an indication for the mission and for the bonus collectible, where the indication for a mission, i.e., sender-defined sequence of selected areas 401, may be different than an indication for a single selected area or set of selected areas 401 that are not a sender-defined sequence. Likewise, the indication for a bonus may also be different.

The digital communication application in which the user composes message 403 may structure message 403 to include annotations, such as annotations conforming to a predefined hypertext markup language or extensible markup language. Accordingly, embedding the collectible may include a process of the collectible composition module 310 inserting (or communicating to the digital communication application so that the digital communication application inserts) a data structure for collectible 402 in a hidden field of message 403 annotations. A hidden field is a document property that is not visible in the user interface, but the software knows about it and can make it visible when the user, for example, reads a paragraph. An example of non-visible character code is as follows:

```
{
collectibleId : 1
earned: false // true when the user reads it
collectibleValue: 100pts
collectibleDependsOnCollectible : 3 //This can't be fully claimed until 3 is claimed as well
...
}
```

Alternatively, or in addition, embedding collectible 402 may include inserting a character code for a non-visible character in message 403, i.e., a character that a user interface of the digital communication application does not render on the user's computer display and that does not print. For example, Unicode's zero width space (U+110.X6).

Alternatively, or in addition, embedding collectible 402 may include inserting a character in message 403 that is formatted to be so small that it is almost invisible, such as a 1-point font size or smaller.

Alternatively, or in addition, embedding collectible 402 may include inserting a character in message 403 that is substantially transparent so that it is almost invisible, such as a transparency of 98.5% or more.

Referring again to FIG. 3, additional aspects of recipient's interaction are illustrated, according to one or more embodiments of the present invention, including a collectible detection module 320 and a collectible accounting module 321 provided for a digital communication application of the recipient, wherein a process of the collectible detection module 320 detects collectibles 402 and detects when the recipient reads selected areas 401 associated with collectibles 402. (It should be understood to "read" in this context, here and throughout the following, may also include viewing, according to the nature of the material in selected area.) A process of the collectible accounting module 321 posts a value associated with collectible 402 to an account for the recipient responsive to the collectible detection module 320 detecting that the recipient has earned a collectible 402, i.e., read a selected area 401 having an associated collectible 402, where the recipient has also satisfied any earning conditions that the sender's collectible composition module 310 further associated with collectible 402, such as a condition that the recipient must read selected areas 401 in a sender-defined sequence.

Detection can be done by monitoring user eye gaze and/or how long he/she stays focused on a piece of text, etc. Responsive to detecting, collectible detection module 320 sets an entry indicating that collectible 402 has been earned.

In this manner, the detecting module 320 and accounting module 321 may cause collectible values to accumulate in the recipient's account responsive to the recipient reading selected parts of one or more messages, i.e., parts having embedded collectibles 402. The accumulating includes adding up posted collectibles 402 and their values.

A collectible redemption module 323 is also provided, according to one or more embodiments of the present invention, that provides a process enabling the recipient to redeem accumulated collectibles 402, i.e., submit collectibles 402 to other users and to applications for purposes and in ways as described herein. Consequently, due to the value for the recipient that is added to messages by collectibles 402, the recipient's focus tends to be directed to those parts of messages that the sender selects.

The collectible detection module 320 may detect that a recipient has read selected area 401 of message 403 having a collectible, according to one or more embodiments of the present invention, by determining that the recipient has scrolled through selected area 401, which may include the collectible detection module 320 receiving communication from the digital communication application that is used by the recipient to read message 403. Additional conditions may apply in one or more embodiments. For example, the collectible detection module 320 may include a condition for deeming that a recipient has read a selected area 401, wherein detecting that a recipient has read a selected area 401 of message 403 having a collectible further includes the condition that the scrolling through selected area 401, i.e., the scrolling from the beginning to the end of selected area 401, occurred during no less than a predetermined minimum time interval, where the predetermined minimum time interval is a time that is sufficient for the recipient to have read the text of selected area 401. In another example, a condition for deeming that a recipient has read a selected area may include both a predetermined minimum time interval and a predetermined maximum time interval for the scrolling, wherein the minimum time interval indicates that the recipient had adequate time to read the text of selected area 401 and the maximum time interval tends to indicate that the recipient did not look away.

For devices equipped with eye gaze detection, the collectible detection module 320 may also detect that a recipient has read a selected area of message 403 having a collectible, according to one or more embodiments of the present invention, in response to eye gaze time, which may be in addition to or instead of scrolling time.

In addition to scrolling, the collectible detection module 320 may also detect that a recipient has read a selected area of message 403 having a collectible, according to one or more embodiments of the present invention, in response to one or more keyboard navigation (or finger navigation on touch devices) actions of recipient, such as monitoring scrolling speed and how long a user stayed at a particular place while scrolling through the document, for example.

The collectible accounting module 321 may start each user with an initial collectible value balance to start them off. The value that a sender specifies for a collectible may include one or more of i) a monetary value and ii) points. The sender may also specify that the value for a collectible 402 or the number of collectibles 402 associated with a selected area 401 in message 403 or a selected mission varies in response to collectible 402 value or the number of collectibles 402 that a recipient has accumulated. (Throughout the present application, including the claims, "or" is inclusive unless explicitly indicated otherwise, so that for the above statement that a "varies in response to collectible 402 value or the number of collectibles 402 . . . ," for example, this includes varying in response to both collectible 402 value and the number of collectibles 402.)

The redemption values that a sender specifies for collectibles 402 may include points required for privilege boosts, wherein a privilege allows a recipient to see more documents in a repository or unlock features in a product, such as a game, for example, and may include points required to do other tasks or for physical goods or services. A recipient may also embed the recipient's accumulated collectibles 402 in messages the recipient composes and sends to others, thereby encouraging those others to read messages the recipient sends.

In embodiments of the present invention, a collectible commodity module 330 is provided that limits the overall number of collectibles 402 that senders may create, the total value of all the collectibles 402 or both the number of collectibles 402 and the value thereof. In this manner, the constraints imposed by the collectible commodity module 330 provide a collectible commodity system. In one such embodiment, the collectible commodity module 330 limits the number of collectibles 402 that each sender may create to a certain number of collectibles 402 per time period, such as one collectible 402 per hour, 10 collectibles 402 per day, etc., where all collectibles 402 created by all senders have the same, fixed value. In one such embodiment, the collectible commodity module 330 limits the number of collectibles 402 of each sender to a certain value of all collectibles 402 created per time period. In one such embodiment, the collectible commodity module 330 limits the number of collectibles 402 of each sender to a certain value of all collectibles 402 created per time period and to a certain number of collectibles 402 per the time period. Although a particular embodiment may limit senders to creating one collectible 402 per day, for example, this does not preclude a sender receiving, as a recipient, more than one collectible 402 per day from other users. Thus, even if the collectible commodity module 330 limits the number of collectibles 402 that each sender may create to a limit of one collectible 402 per day, some users may earn and accumulate more than one collectible 402 per day.

In one or more embodiments of the present invention, a collectible message listing module 322 is provided for a digital communication application of the recipient, wherein the digital communication application presents the recipient's messages in a list of recipient's user interface and a process of the collectible message listing module 322 causes the recipient's digital communication application to show at the top of the list those messages that have collectibles 402 the recipient has not yet earned. This may include listing messages 403 having unearned collectibles 402 in a priority, wherein messages having more collectibles 402 are shown higher in the list. Alternatively, messages having more collectible value are shown higher in the list. More generally, the collectible message listing module 322 causes the recipient's digital communication application to pin messages in a particular location within the recipient's user interface based on unearned collectibles 402, e.g., number of collectibles 402 or value of collectibles 402.

In one or more embodiments of the present invention, a process of the collectible composition module 310 may cause the indication representing a collectible 402 to change over time intervals if a collectible 402 is not earned by the recipient during the time intervals. For example, if the collectible 402 is not earned, an initially hidden collectible 402 may be progressively revealed in the recipient's digital communication application user interface, first very faintly after a first time interval and then more brightly after a second time interval. In a further alternative, the appearance of collectible 402 may change color over time in similar fashion, from a less visible color to a more visible color.

Figure 5:
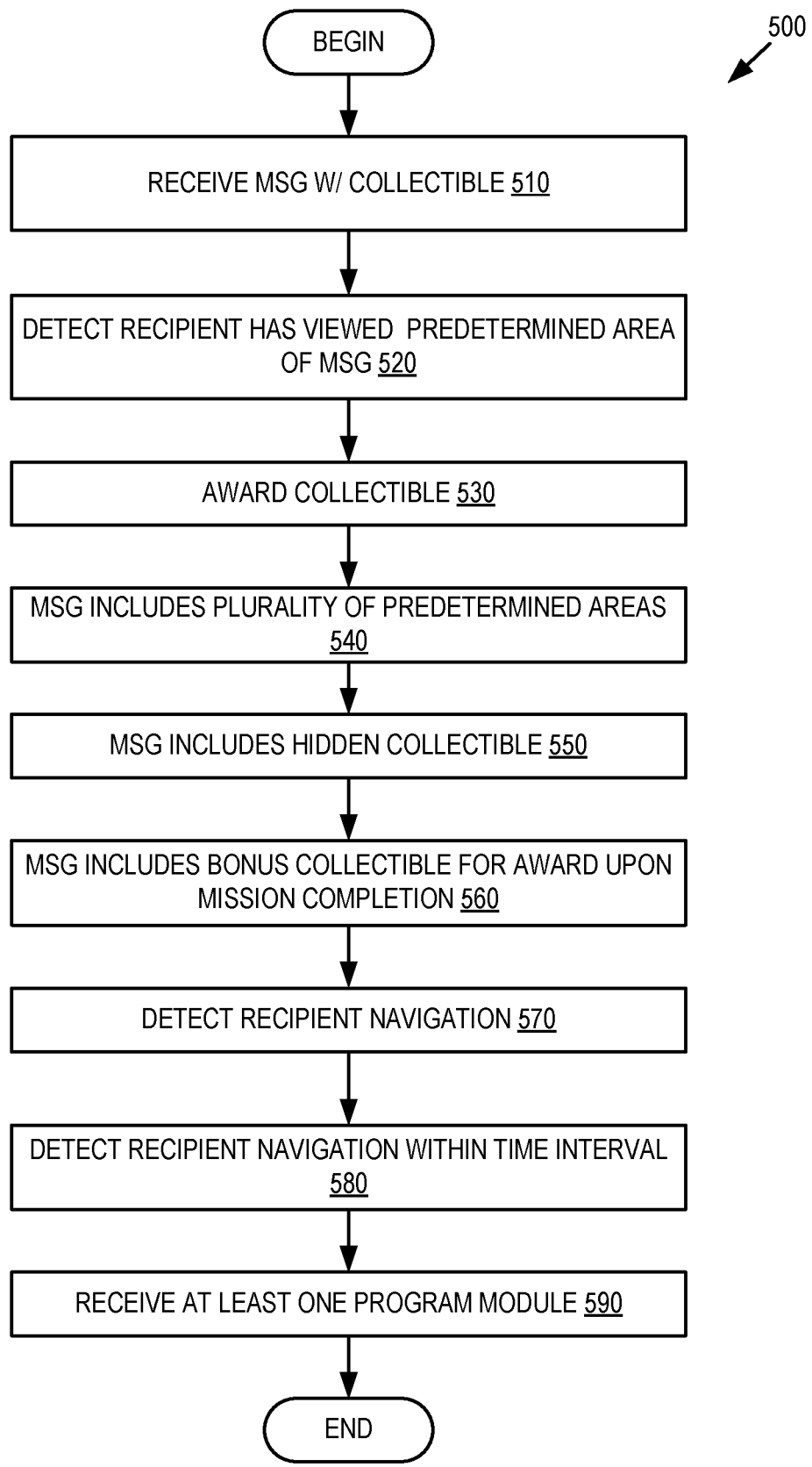
FIG. 5 illustrates, in a flow chart, actions of controlling user engagement by a sender of media over a network, according to embodiments of the present invention.

Referring now to FIG. 5, a method 500 for engaging a message recipient includes receiving 510, by a computer system for a recipient, a message having a collectible associated with at least one predetermined area of the message, wherein the at least one predetermined area has been selected by a sender. At 520 a computer system detects that the recipient has viewed the at least one predetermined area of the message. At 530, the collectible is awarded to the recipient by the computer system, so that the recipient can use the collectible in a transaction, wherein the awarding is responsive to the detecting of the viewing of the at least one predetermined area of the message.

In another aspect, the message has a plurality of predetermined areas and includes presenting 540 the message to the recipient on a display of the computer system, and wherein the detecting that the recipient has viewed the at least one predetermined area includes detecting that the recipient has viewed the plurality of predetermined areas of the message in a predetermined sequence.

At 550 the message is presented to the recipient on a display of the computer system, wherein the collectible is hidden in the message.

At 560, the message is presented to the recipient on a display of the computer system, wherein the collectible includes a bonus collectible in the message, and wherein the detecting that the recipient has viewed the at least one predetermined area includes detecting that the recipient has viewed the plurality of predetermined areas of the message in a predetermined sequence, and wherein the awarding of the collectible to the recipient includes awarding to the recipient the bonus collectible responsive to the detecting that the recipient has viewed the plurality of predetermined areas of the message in the predetermined sequence.

At 570, the detecting that the recipient has viewed the at least one predetermined area of the message includes detecting that the recipient has navigated the at least one predetermined area of the message.

At 580 the detecting that the recipient has navigated the at least one predetermined area of the message includes detecting that the recipient has navigated the selected area in greater than a predetermined minimum time interval and less than a predetermined maximum time interval.

At 590, the receiving of the message includes receiving at least one program module configured at least for detecting that the recipient has viewed the at least one predetermined area of the message and for awarding the collectible to the recipient by the computer system, wherein the at least one program module is configured to operate with a digital communication application of the recipient.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for engaging a message recipient comprising:
    receiving, by a computer system for a first recipient, a first email message that has been configured by an instance of a composition program module for reading via an email application of the computer system, wherein the first email message has a collectible associated with a first designated area of the first email message, wherein the first designated area has been selected by a sender via the composition program module;
    presenting the first email message to the first recipient by the email application of the computer system on a display of the computer system;
    receiving, by the computer system for the recipient, an instance of a detection program module and of the composition program module with the first email message, the detection program module being configured to operate with the email application for enabling the computer system to detect that the first recipient has viewed the first email message and to award the collectible;
    detecting the first recipient viewing the first email message by the computer system executing instructions of the email application and instructions of the detection program module that was received with the first email message, wherein the first designated area of the first email has a beginning and an end, and the detecting that the recipient has viewed the first designated area of the first email includes:
    detecting that the recipient has scrolled through the first designated area from the first designated area's beginning to the first designated area's end, where a time interval that begins when the user has scrolled to the first designated area's beginning and terminates when the user has scrolled to the first designated area's end is greater than a predetermined minimum and less than a predetermined maximum;
    awarding the collectible to the first recipient by the computer system, wherein the awarding is responsive to the detecting the first recipient viewing the first email message, including detecting the first recipient viewing the designated area of the first email message;
    generating a second email message from the first recipient to a second recipient via the email application, wherein the collectible awarded to the first recipient is associated in the second email message with an area designated by the first recipient via the computer system executing instructions of the composition module that was received with the first email message; and
    sending, by the computer system, the second email message to the second recipient, including sending the collectible and an instance of the composition and detection modules, the detection module detecting the collectible associated with the designated area of the second email message, wherein the composition module instances configure the collectible to be rendered invisible when the first and second email messages are initially displayed to the respective recipients and cause the collectible to become visible to the respective recipients in response to detecting passage of a predetermined amount of time during which the designated areas of the respective messages are displayed.

2. The method of claim 1, wherein the first message has at least one predetermined area in addition to the first predetermined area, wherein the detecting the first recipient viewing the first message includes detecting the first recipient viewing the first and second predetermined areas of the message in a predetermined sequence.

3. The method of claim 1, wherein in the presenting the first message to the first recipient by the digital communication application of the computer system on a display of the computer system, the collectible in the first message is located apart from the first predetermined area.

4. The method of claim 2, wherein the collectible received in the first message includes a bonus collectible, and wherein the awarding of the collectible to the first recipient includes awarding the bonus collectible responsive to the detecting the first recipient viewing the first and second predetermined areas of the message in the predetermined sequence.

5. A system for engaging a message recipient comprising:
    a processor; and
    a computer readable storage medium connected to the processor, wherein the computer readable storage medium has stored thereon a program for controlling the processor, and wherein the processor is operative with the program to execute the program for:
    receiving, by a computer system for a first recipient, a first email message that has been configured by an instance of a composition program module for reading via an email application of the computer system, wherein the first email message has a collectible associated with a first designated area of the first email message, wherein the first designated area has been selected by a sender via the composition program module;
    presenting the first email message to the first recipient by the email application of the computer system on a display of the computer system;
    receiving, by the computer system for the recipient, an instance of a detection program module and of the composition program module with the first email message, the detection program module being configured to operate with the email application for enabling the computer system to detect that the first recipient has viewed the first email message and to award the collectible;
    detecting the first recipient viewing the first email message by the computer system executing instructions of the email application and instructions of the detection program module that was received with the first email message, wherein the first designated area of the first email has a beginning and an end, and the detecting that the recipient has viewed the first designated area of the first email includes:
    detecting that the recipient has scrolled through the first designated area from the first designated area's beginning to the first designated area's end, where a time interval that begins when the user has scrolled to the first designated area's beginning and terminates when the user has scrolled to the first designated area's end is greater than a predetermined minimum and less than a predetermined maximum;
    awarding the collectible to the first recipient by the computer system, wherein the awarding is responsive to the detecting the first recipient viewing the first email message, including detecting the first recipient viewing the designated area of the first email message;

generating a second email message from the first recipient to a second recipient via the email application, wherein the collectible awarded to the first recipient is associated in the second email message with an area designated by the first recipient via the computer system executing instructions of the composition module that was received with the first email message; and sending, by the computer system, the second email message to the second recipient, including sending the collectible and an instance of the composition and detection modules, the detection module detecting the collectible associated with the designated area of the second email message, wherein the composition module instances configure the collectible to be rendered invisible when the first and second email messages are initially displayed to the respective recipients and cause the collectible to become visible to the respective recipients in response to detecting passage of a predetermined amount of time during which the designated areas of the respective messages are displayed.

6. The system of claim 5, wherein the first message has at least one predetermined area in addition to the first predetermined area, wherein the detecting the first recipient viewing the first message includes detecting the first recipient viewing the first and second predetermined areas of the message in a predetermined sequence.

7. The system of claim 5, wherein in the presenting the first message to the first recipient by the digital communication application of the computer system on a display of the computer system, the collectible in the first message is located apart from the first predetermined area.

8. The system of claim 6, wherein the collectible received in the first message includes a bonus collectible, and wherein the awarding of the collectible to the first recipient includes awarding the bonus collectible responsive to the detecting the first recipient viewing the first and second predetermined areas of the message in the predetermined sequence.

9. A computer program product for engaging a message recipient, including a computer readable storage medium having instructions stored thereon for execution by a computer system, wherein the instructions, when executed by the computer system, cause the computer system to implement a method comprising:

receiving, by a computer system for a first recipient, a first email message that has been configured by an instance of a composition prodram module for reading via an email application of the computer system, wherein the first email message has a collectible associated with a first designated area of the first email message, wherein the first designated area has been selected by a sender via the composition program module;

presenting the first email message to the first recipient by the email application of the computer system on a display of the computer system;

receiving, by the computer system for the recipient, an instance of a detection program module and of Rail the composition program module with the first email message, the detection program module being configured to operate with the email application for enabling the computer system to detect that the first recipient has viewed the first email message and to award the collectible;

detecting the first recipient viewing the first email message by the computer system executing instructions of the email application and instructions of the detection program module that was received with the first email message, wherein the first designated area of the first email has a beginning and an end, and the detecting that the recipient has viewed the first designated area of the first email includes:

detecting that the recipient has scrolled through the first designated area from the first designated area's beginning to the first designated area's end, where a time interval that begins when the user has scrolled to the first designated area's beginning and terminates when the user has scrolled to the first designated area's end is greater than a predetermined minimum and less than a predetermined maximum;

awarding the collectible to the first recipient by the computer system, wherein the awarding is responsive to the detecting the first recipient viewing the first email message, including detecting the first recipient viewing the designated area of the first email message;

generating a second email message from the first recipient to a second recipient via the email application, wherein the collectible awarded to the first recipient is associated in the second email message with an area designated by the first recipient via the computer system executing instructions of the composition module that was received with the first email message; and sending, by the computer system, the second email message to the second recipient, including sending the collectible and an instance of the composition detection modules, the detection module detecting the collectible associated with the designated area of the second email message, wherein the composition module instances configure the collectible to be rendered invisible when the first and second email messages are initially displayed to the respective recipients and cause the collectible to become visible to the respective recipients in response to detecting passage of a predetermined amount of time during which the designated areas of the respective messages are displayed.

10. The computer program product of claim 9, wherein the first message has at least one predetermined area in addition to the first predetermined area, wherein the detecting the first recipient viewing the first message includes detecting the first recipient viewing the first and second predetermined areas of the message in a predetermined sequence.

11. The computer program product of claim 9, wherein in the presenting the first message to the first recipient by the digital communication application of the computer system on a display of the computer system, the collectible in the first message is located apart from the first predetermined area.

12. The computer program product of claim 10, wherein the collectible received in the first message includes a bonus collectible, and wherein the awarding of the collectible to the first recipient includes awarding the bonus collectible responsive to the detecting the first recipient viewing the first and second predetermined areas of the message in the predetermined sequence.

13. The method of claim 1, wherein the collectible includes a scrip.

* * * * *